United States Patent Office 2,930,792
Patented Mar. 29, 1960

2,930,792

METHOD FOR CONDITIONING VAT DYE FILTER CAKES

Maurice H. Fleysher, Buffalo, N.Y., assignor to Allied Chemical Corporation, a corporation of New York No Drawing. Application July 31, 1957
Serial No. 675,296

7 Claims. (Cl. 260—265)

This invention relates to a method for conditioning vat dye filter cakes to obtain, ultimately, vat dye pastes, powders, or flakes wherein the individual vat dye particles are in such form that aqueous dispersions of such particles are characterized by high fluidity at high color solids concentration without being subject to thixotropic reversal on standing, high penetrability, high dispersion, and exceptional freedom from agglomerated particles. The conditioning treatment results in a particular and exceptionally uniform particle size and shape distribution and increases the average effective electrostatic charge, or "zeta potential," of the individual particles.

Certain modern mechanized methods for dyeing textiles, such as pigment-padding methods for dyeing fabric and some "package" methods for dyeing yarn, involve contacting the textile material with an aqueous suspension of vat dye particles and thereafter subjecting the particle laden textile material to vatting, oxidation, and finishing operations to complete the fixation of the dye on the textile. To obtain the uniform distribution of vat dye particles on the textile surfaces which these processes require, the vat dye suspensions must be uniformly dispersed, fluid and penetrating.

In the pigment-padding methods, if the vat dye dispersion contains insoluble matter and agglomerated particles or is otherwise too non-uniform in particle size and shape distribution, the goods will be spoiled because of specking, splashing, streaking, uneven dyeings, "dirty" dyeings and the like.

Certain package methods for dyeing yarn involve passing an aqueous suspension of vat dye particles inwardly and outwardly through a loosely-wound bundle of yarn, or "package," shaped like a cylindrical or conical tube. Over-size matter in the vat dye dispersion filters out on the inner and outer surfaces and subjacent regions of the package, forming highly objectionable scums. Coarse matter deposited on the yarn or thread can also, by abrasion, cause frequent breaking of the yarn or thread when run through high speed knitting, sewing or weaving machinery.

Vat dye preparations for use in these processes are purchased on the basis of exacting specifications which require that a diluted aqueous dispersion of the dye shall leave a minimal non-dispersible residue and shall pass through a double filter paper in a minimum time while leaving a minimal filtration residue retained on the paper.

In the water dispersion tests, samples of the vat dye paste to be tested and of a reference paste, in amounts by weight proportional to their color strengths (about 2 grams on an equal color strength basis) are diluted with 100 cc. of water in beakers; the diluted samples are subjected to equal mixing action to disperse the dye uniformly; the resulting dispersions are allowed to stand for equal intervals (about 4 minutes) to allow poorly dispersed matter to settle out; the stable suspensions are then simultaneously decanted from the sediments by use of a tilting rack; and the sediments are collected on filter papers and compared.

In the filtration tests, samples of the vat dye paste to be tested and of a reference paste in amounts by weight proportional to their color strengths (about 2 grams on an equal color strength basis) are diluted with water (about 400 cc.); the diluted samples are subjected to equal mixing action to disperse the color uniformly; and the resulting dispersions are filtered through a double layer of filter paper (Whatman No. 4) on a Büchner funnel under vacuum (about 24 inches Hg). Filtration times are measured and the residues retained on the papers are compared and evaluated.

In these tests, visual evaluation of the residues by a skilled observer is preferred to weights of residue, because the character as well as the weight of residue is important.

Most vat dyes are marketed in the form of concentrated aqueous pastes. Concentrated pastes are preferred to dilute pastes in order to minimize shipping and storage costs. Fluid pastes are preferred to more viscous pastes for ease of handling, and to avoid loss of costly materials because of incomplete drainage of containers and adhesion of paste to various surfaces. Also the paste should be stable, that is, not settle out on standing. To varying degrees, ordinary vat dye pastes will gel, that is, undergo a thixotropic reversal of fluidity on standing.

The known processes for preparing vat dye pastes, powders and flakes involve precipitating a vat dye in an aqueous medium and recovering the precipitated color in the form of a water-containing filter cake, which is then dispersed by mechanical working, usually in the presence of added chemicals. Some vat dyes are synthesized by processes in which the crude vat dye is isolated from the reaction medium in which it was formed, in the form of such a water-containng filter cake which may be directly dispersed and processed to recover a standardized vat dye paste, powder or flake. Other vat dyes are synthesized by processes in which the crude vat dye is first isolated from a reaction medium containing an organic solvent or diluent which is separated by filtration or steam distillation.

Usually, the isolated vat dye is conditioned, and sometimes purified, by converting it into a water-containing filter cake by a so-called "acid-pasting" process, which involves dissolving the crude vat dye in concentrated sulfuric acid and adding the resulting solution to a relatively large excess of water, whereupon the vat dye precipitates from the diluted acid medium and is isolated by filtration. In certain processes in which it is desired to effect a greater separation of the vat dye from associated impurities, the crude vat dye is first "vatted" (treated with an aqueous solution of caustic soda and sodium hydrosulfite) to convert the vat dye to an aqueous solution of the sodium salt of the leuco form of the vat dye which is sludge filtered to separate the impurities, and the filtrate is then oxidized with air or other oxidant to precipitate the color in the form of a water-containing filter cake.

The vat dye contained in such filter cakes is chemically purer than in cruder forms, is more amenable to processing treatments for improving dispersibility, and often is in a condition wherein it is more adherent to textile surfaces when "padded" thereon. Such water-containing filter cakes are the essential starting material for conventional prior art processes for making vat dye pastes, powders and flakes. They constitute a preferred starting material for the process of the present invention.

If the filter-cakes contain excessive amounts of water, they may be concentrated in various known ways, for example by partial evaporation of the water content, before further processing. This makes possible the recovery of some vat dyes as pastes having a higher concentration of color solids than would otherwise be obtainable.

Besides isolating the precipitated vat dye by filtration, it is possible (but not usual) to isolate the precipitated vat dye by settling the precipitate and decanting off the mother liquor, or by subjecting the mixture to centrifuging and collecting the precipitate as a cake. The term "filter cake" is employed herein in the broad sense to include generically precipitates isolated in any of these ways.

Vat dye pastes are usually prepared by working the filter cake in the presence of a dispersing agent, such as "Tamol" (the sodium salt of a condensation product of formaldehyde and naphthalene sulfonic acid), and sufficient alkali to bring the pH of the resulting paste up to about 9.0. Other chemicals may be incorporated for special purposes, as desired; for example, glycerine, diethylene glycol, triethanolamine or the like may be added to keep the paste from drying out and to assist in the use of the vat dye in printing. Various methods and apparatus may be used to disperse the paste, including the types of milling apparatus described below. A preferred method involves circulating the vat dye paste between the top and bottom of an agitated tank via a conduit line containing a centrifugal pump which forces the paste through screens prior to discharging into the top of the tank. Water is then added, if necessary, to adjust the color concentration of the paste to a standard value.

Flakes and powders are prepared by mixing the vat dye paste or filter cake with dispersing agents and various chemical additives (e.g., isobutyl sulfate, dextrin, cerelose, etc.), working the mixture mechanically until homogenized and dispersed, and drying the dispersion to a powder (e.g., by spray-drying) or to flakes (e.g., on a rotary double-drum unit). Representative powders and flakes have the following compositions:

|  | Percent |
| --- | --- |
| Vat dye solids | 25 |
| Dispersing agent (e.g., "Tamol") | 15–20 |
| Sodium isobutyl sulfate | 20–25 |
| Dextrin | 15 |
| Cerelose | Balance |

While the above conditioning treatments improve the vat dyes in certain respects, the vat dye pastes, powders and flakes heretofore produced are unsatisfactory, especially for use in dyeing by application methods such as the pigment-padding processes and some "package" dyeing methods; they have inadequate fluidity at high color solids concentration, lack adequate dispersibility and penetrability, and vary greatly in particle size.

According to the present invention, a vat dye which has been produced by precipitation from an aqueous medium followed by separation of the precipitate is subjected to milling, preferably in the form of an aqueous filter cake, in admixture with a solid, water-soluble alkali metal salt of an inorganic acid in an aqueous medium essentially comprising a saturated aqueous solution of a water-soluble alkali metal salt of an inorganic acid, preferably the same salt.

Various alkali metal salts of various inorganic acids may be employed in the practice of the present invention, and especially sodium chloride, potassium chloride, sodium sulfate and potassium sulfate. Water soluble abrasive materials other than salts, e.g. boric acid, have not been found to be satisfactory. Preferred salts, which include sodium chloride, are characterized by high ionization constants. Salts which crystallize in forms containing water of crystallization, e.g. sodium sulfate, appear to be somewhat less effective than salts which crystallize in forms which do not contain water of crystallization. Other things being equal the salt used should not be too soluble (or an excessive amount is required to saturate the aqueous phase) or too insoluble (or an excessive amount of water is required to dissolve it away when milling is completed). In considering the solubility of a given salt, it should be kept in mind that the milling operation may cause a considerable increase in the temperature of the suspension being milled; hence it is the solubility of the salt at the operating temperature that is important.

The amount of solid salt employed is generally equal to at least one-half the weight of dye solids, and preferably is 2 to 10 times the weight of dye solids, present in the quantity of filter-cake being treated. Larger salt:dye solid ratios are operative, but they increase the cost of operation and reduce the effective capacity of the equipment without providing any particular advantage.

The amount of aqueous phase employed is generally at least 8 parts by weight per part by weight of the dye solids, and preferably is about 10 to 25 parts per part by weight thereof. Larger aqueous phase:dye solids ratios are operative, but they increase costs and reduce effective equipment capacity without providing any particular advantage.

Filter cakes obtained by procedures such as those outlined above normally contain 10% to 35% of dye solids and from 65% to 90% of water, or, expressed differently, from 2 to 9 parts of water per part dye solids. Thus, in the usual case, the amount of water present in the filter cake is insufficient to provide all the aqueous phase which is desired for the milling operation, and saturated salt solution is added. Additional solid salt is then added in amount sufficient to (1) saturate the aqueous phase, i.e. that part of it contributed by the water in the filter cake, and (2) provide the required excess salt in the solid phase. In relatively rare instances, the water present in the filter cake may be sufficient to provide all the water wanted, in which case solid salt only is added in amount sufficient to saturate the water present and provide the needed solid salt.

Various types of milling equipment may be used to work the salt-dye solid slurry. Preferred types are those which subject the solid particles to intense motion frequently interrupted by impacts and changes in direction. An example of such a mill is the "Kady" type mill, described below in connection with Example 1. Good results may be obtained on the small scale by using a conventional agitator in a beaker provided with vertically disposed baffles whereon the slurry particles impinge. Micropulverizers and "Waring Blendor" type mixers also may be used to advantage, but their use is limited by their relatively small volumetric capacities.

In preferred operation on a commercial scale, a body of slurry is maintained in suspension in an agitator-equipped cone-bottomed tank which discharges from the cone apex to a conduit line containing a centrifugal pump which pumps slurry back to the top of the tank continuously. If desired, the slurry may be pumped through screens prior to its discharge into the top of the tank. In this type of equipment, most of the milling action is effected by the centrifugal pump. This equipment has the advantages that the capacity of the equipment is relatively large and both equipment and processing costs are relatively low. Ball mills are operative but not preferred because they are costly, have low capacities and long cycle times, and tend to introduce insoluble contaminating matter through abrasion of the balls.

The time required to complete the milling operation varies with the vat dye being processed, the relative proportions of dye solids (color solids), salt and water in the suspension being processed, and, most of all, with the kind of milling equipment used. Different types of milling apparatus vary widely as to the intensity and efficiency of the forces they apply and, as a result, in their capacities and cycle time.

The following empirical test may be used to determine whether or not the salt-milling operation has been completed to a satisfactory degree: A sample of the batch is diluted with about just enough water to dissolve the solid salt present, stirred until the salt is dissolved, and allowed to stand. If the salt milling has been completed, the sample will stratify into a lower layer of clear saturated salt solution and an upper colored layer of uniform dye suspension, separated by a distinct phase boundary. Microscopic examination of a sample of the slurry at this stage will show a particle size and shape distribution characteristic for the vat dye when conditioned by this process. If the salt milling is unfinished, the dye solids will settle out and there will be no stratification into clear and colored phases.

When the salt milling operation is completed, sufficient water is added to dissolve all of the salt present, and the batch is agitated until this is accomplished. Preferably the batch is then allowed to stratify into a lower layer of clear salt solution and an upper layer of dye suspension. These layers are then discharged successively to a suitable filter such as a suction filter. The filter cake is then washed with water until substantially free of salt, as evidenced by testing the effluent wash liquor.

The amount of water used to dissolve the excess salt prior to filtration may be somewhat in excess of the minimum amount necessary to dissolve the salt. However, if too much excess water is used, part of the dye suspension may pass through the filter before a filter cake starts to build up.

The resulting filter cakes of vat dyes conditioned by the treatment of this invention can be further processed to produce finished vat dye pastes, powders, or flakes by any of conventional methods used to process ordinary vat dye filter cakes for production of finished products.

Vat dye preparations made in accordance with the present invention surpass those prepared by prior methods, often to a very great degree, when evaluated by the highly critical and exacting quality criteria set out above, by actual dye application tests, and by performance in commercial scale processing equipment. Vat dye pastes prepared according to the process of this invention are characterized by the ability to remain both stable and fluid at high color solids concentrations for very long times. In these respects they surpass pastes prepared by conventional prior methods to a degree which varies with the chemical constitution of the individual vat dyes but which is often very great.

The wet salt-milling treatment of the present invention results in the following advantages: (1) particle size and shape distributions are more uniform; (2) average particle size is reduced in most instances, although individual colors vary considerably in this respect; (3) the concentration of over-size particles and agglomerates is greatly reduced; (4) the samples are much "cleaner" in appearance; and (5) very fine particles, "hairs," "shavings" and the like, which are present in vat dye pastes produced without the salt-milling treatment of the present invention, are absent from vat dye pastes produced in accordance with the present invention. Vat dye pastes which show a high concentration of "hairs" and the like under the electronmicroscope give, when diluted, poor results in filtration tests. Apparently the "hairs" and the like fine particles form mats which obstruct flow and retain larger particles. A high concentration of relatively under-sized particles—characteristic of conventional pastes—is not necessarily desirable because, inter alia, they may be dispersed to a degree that will prevent sufficiently firm adhesion of the particles to textile materials during padding, or they may penetrate to inner regions of the fiber where their coloring power is wasted.

The individual vat dye particles in pastes prepared in accordance with the present invention have a greater effective electrostatic charge per particle than do the particles present in conventional dye pastes of the same vat dye. This is shown by electrophoretic studies involving apparatus and techniques similar to those described in American Dyestuff Reporter, volume 35, pages P3 and P4 (January 14, 1946). The measurements were carried out as follows: A filter paper supported on a glass plate was clamped thereto at opposite ends by electrodes connected to a source of direct current; the paper was moistened by distilled water; a direct current of 150 volts was applied to the electrodes; a drop of vat dye suspension was placed in the center of the paper, the current was discontinued after a measured interval of time. In all instances the "spot" of dye particles moved more or less uniformly towards the anode showing that the particles had an effective net electronegative charge. Some 30 measurements involving 12 vat dye pastes were made. In all instances the electrophoretic particle velocities (i.e. displacements of the particles toward the anode during equal intervals of time under the action of equal applied electromotive forces) were definitely greater for the vat dye pastes prepared by the wet salt-milling technique of the present invention than for samples prepared by conventional prior art methods, regardless of whether the particle velocities were measured as maximum, minimum or average. This shows that the individual particles in the vat dye pastes of the present invention had a higher effective electrostatic charge (a higher zeta potential) than did the particles in the conventional vat dye pastes. Because of the greater effective electrostatic charge or zeta potential possessed by the particles in the pastes produced in accordance with the present invention, the particles repel each other with increased force. This appears to explain the facts that vat dye pastes produced in accordance with the present invention have greater dispersion stability, and, when diluted, have greater penetration, than do conventional vat dye pastes.

To a greater or lesser degree depending on the nature of the dye involved, vat dye pastes prepared by conventional prior art methods undergo a thixotropic reversal of fluidity on standing. This is very undesirable because (1) thick pastes are harder to measure and process than are thin pastes, and (2) they do not drain completely from containers and tend to adhere to various surfaces resulting in a loss of costly material. This defect is pronounced in some of the most important vat dyes, notably Anthraquinone Vat Khaki 2G (New Colour Index 71050). Vat dye pastes of this dye prepared by known methods and particularly at higher color solids concentrations, will, on standing, set to a mass which is non-pourable. Yet, vat dye pastes of this dye, when prepared by the process of this invention, have an almost water-like fluidity at the highest dye solids concentrations used in commerce, and do not lose this fluidity on standing to any significant degree. This is also true in general with respect to other vat dyes subject to these defects.

Another important desired quality of vat dye pastes is that they shall remain stable, i.e., that the dispersed particles shall not settle out on standing. Some vat dyes are more prone than others to form unstable pastes when processed by prior art methods. Vat dye pastes prepared by the process of this invention are characterized by high paste stability regardless of the particular characteristics of the individual dye.

Vat dye pastes purchased for use in modern pigment padding methods for dyeing fabric and in those "package" methods for dyeing yarn in which the dye is first applied to the yarn as a pigment (rather than as a solution of the leuco form of the dye) are evaluated by quality criteria which are much more difficult to meet than were previous standards, which sufficed for vat dye pastes to be applied by conventional vatting methods. These exacting specifications are based on rather simple empirical tests in which the properties of the sample being tested are compared with those of a standard vat dye paste whose properties and performance in full-scale manufacturing processes are known. These are the dispersibility and filterability tests set out above.

Dispersions prepared from vat dye pastes of highest quality will flow through the double filter paper of the above filterability test in very short times (e.g., 6 to 12 seconds) and leave very little filtration residue despite the fact that the dispersion contains no measurable amount of dye in the dissolved state as distinguished from the solid (but dispersed) state. Dispersions prepared from vat dye pastes of a somewhat lower quality but which are substantially equally acceptable for use in conventional vatting processes may, under comparable conditions, have filtration times of several minutes and leave a considerable residue.

The above-described dispersibility and filterability tests provide reliable criteria for characterizing vat dye pastes as to their dispersibility, penetrating power and stability of the dispersions, their general "cleanliness," their freedom from non-dispersible contaminating matter, which is generally non-vattable and highly undesirable. The most important improvement resulting from the process of this invention relates to the quality criteria which are measured by these very sensitive tests.

In those coloring processes wherein a vat dye is first applied to the textile as a dispersion of solid particles rather than as a solution of the leuco form of the dye (i.e., printing on fabrics, pigment padding methods for dyeing fabrics and yarn "packages") the effective coloring power of the vat dye paste, powder, or flake depends not only on the concentration of dye solids therein (weight percent basis), but also on the physical characteristics of the individual particles. Accordingly vat dye preparations are standardized on the basis of their coloring power for textile goods as determined by making dyeings according to standardized testing procedures. The coloring power of vat dye pastes, powders and flakes processed according to this invention is in many instances substantially greater (and is never less) than the coloring power of similar preparations prepared by conventional prior art procedures. This means that a greater recovery of useful color value can be obtained from the filter cakes of many vat dyes if they are processed according to the technique of this invention.

Vat dye pastes having a higher concentration of dye solids are preferred in principle to pastes having less color content because shipping, handling and storage costs are less for the more concentrated pastes. Heretofore attempts to increase the concentration of dye solids in vat dye pastes have been limited by the fact that, as the concentration of dye solids in the paste was increased, the paste became increasingly less fluid and suffered a loss of quality, as measured by the dispersibility and filterability tests. These limiting factors are much less operative if the paste is prepared according to the process of the present invention. In some instances (e.g., Anthraquinone Vat Khaki 2G) it has been possible to prepare vat dye pastes which not only have twice the color content of representative prior art pastes but are also equal or superior thereto in fluidity, dispersibility, paste stability, and quality criteria measured by the above filterability test.

Vat dye powders and flakes, though more expensive, are sometimes preferred to pastes because they are somewhat easier to measure out and handle and because pastes tend to dry out with loss of dispersibility, if allowed to stand in opened containers. However, vat dye powders and flakes also depend for their utilization on the particle size and condition resulting from their precipitation; in use, they are at most reconstituted aqueous suspensions of the type from which they were prepared by drying and, in many cases are less satisfactory than vat dye pastes. In the case of vat dye powders and flakes prepared in accordance with the present invention, the above improvement in dispersibility and filterability of the aqueous pastes made from them are also realized.

The invention will be illustrated by the following specific examples, but it is to be understood that it is not limited to the details thereof and that changes can be made without departing from the scope of the invention. The temperatures are in degrees centigrade and the parts and percentages are by weight, unless designated as parts by volume. Where parts are by volume, the amount signifies the volume occupied by the same number of parts by weight of water at 4° C.

EXAMPLE 1

The vat dyestuff employed in this example was Anthraquinone Vat Khaki 2G (New Colour Index 71050) in the form of a filter cake containing 34 percent of color solids. It was prepared by the known process involving carbazolizing pentanthrimide by fusion in an aluminum chloride melt, adding the fusion melt to an excess of water, isolating a filter cake of the resulting crude color, forming an aqueous slurry of the filter cake, treating the slurry with sodium hypochlorite to "bleach" the color, isolating the "bleached" color as a filter cake, and washing it to remove water-soluble matter.

The milling equipment used in this example was a "Kady" mill of the type described in U.S. Patents 2,628,081 and 2,706,621 and comprising centrally disposed rotor discs having pitched planar surfaces which project slurry laterally against a cylindrical annular baffle containing spaced vertical slots.

Part A.—Saturated sodium chloride brine (1440 parts, containing 380 parts of NaCl) and the washed Anthraquinone Khaki 2G filter cake (600 parts containing 204 parts of dye solids) were charged to the mill and the mixture was milled for a short time to break up the filter cake and suspend the solid vat dye in the brine. Crystalline sodium chloride (458 parts) was added, and the mill was run for an additional 75 minutes. The slurry was then diluted with 4,000 parts of water, stirred to dissolve the excess salt and allowed to stand. The slurry stratified into a lower layer of clear sodium chloride brine and an upper layer of colored suspension, separated by a definite phase boundary. The lower (clear) and upper (colored) layers were successively filtered on a suction filter, and the filter cake was washed with water until the filtrate gave a negative test for chloride ion with silver nitrate solution. The washed filter cake (503 parts) was thoroughly mixed with a small amount of dispersing agent (5 parts of "Tamol": the sodium salt of a condensation product of formaldehyde and naphthalene sulfonic acids). The resulting dispersion was a fluid, nonthixotropic paste containing 37.5% of total solids. A portion of the paste (104 parts) was diluted with water (46 parts) to obtain a paste (25.1 parts total solids) having substantially the color concentration (strength) of commercial Anthraquinone Vat Khaki 2G Double Paste. The resulting paste was water-like in its fluidity. This paste is identified hereinafter as "dyestuff No. 1."

Part B.—For purposes of comparison, a vat dye paste was prepared in the same manner from the same Anthraquinone Vat Khaki 2G filter cake employed in Part A of this example, but without the salt-milling treatment; that is, by dispersing the washed filter cake directly with "Tamol," as in Part A, but without the intermediate salt-milling treatment. The resulting paste, identified hereinafter as "dyestuff No. 2" and having substantially the color concentration (strength) of commercial Anthraquinone Vat Khaki 2G Double Paste, was a thick, thixotropic paste. It is representative of dyestuff pastes of this vat dye ordinarily obtained commercially.

In order to compare their properties, dyestuffs Nos. 1 and 2 were tested for color strength, for dispersibility and for filterability.

The color strengths were determined by standardized testing procedures of a type well known in the art which reproduce on a laboratory scale the essential conditions and procedures of commercial dyeing methods, in this instance the conventional "pad-jig" method for dyeing fabric. In order to evaluate the samples on an equal basis, the color strengths of the dyes by the ordinary vatting procedure were first determined for reference purposes, as follows: The color strength obtained from a known weight of dyestuff No. 2 was given an arbitrary value of 100. Dyeings were then made with various weights of dyestuff No. 1 until dyeings equal in color strength to that of dyestuff No. 2 were obtained. The color strength of the test sample in terms of that of the reference sample is then given by the equation $$\frac{\text{Weight of reference sample}}{\text{Weight of test sample equal to reference sample in color strength}} \times 100$$

This color strength was then used in carrying out the further tests.

Similar tests for color strength by the "pad-jig" dyeing method were carried out.

The color strength of a test sample in terms of the color strength of a reference sample may or may not be the same when measured by the vatting and by the pad-jig dyeing procedures. This is because the color strength determined by the vatting method is substantially directly proportional to the weight of color in the dye paste used in the test, whereas the color strength as determined by padding methods depends also on the physical form of the color particles in the paste and their ability to "pad" the textile surface securely.

Dispersibility and filterability were determined in the manner set out above.

The results are set out in the following Table 1.

Table 1

| | Dyestuff No. | |
|---|---|---|
| | 2 (Control) | 1 |
| Color Strength: | | |
| "Vatted" on Yarn | 100 | 95. |
| "Pad-Jig" on Fabric | 100 | 95. |
| Dispersibility: Residue | Heavy | Slight. |
| Filterability: | | |
| Time | Over 4 Minutes | 12 Seconds. |
| Residue | Heavy | Slight. |

The data in Table 1 show that dyestuff No. 1 is very superior to dyestuff No. 2 in dispersibility and filtration characteristics. The differences in filtration times and residues are striking.

EXAMPLE 2

Part A.—A mixture of 140 parts of a filter cake of Anthraquinone Vat Khaki 2G (containing 50 parts of dye solids and obtained in essentially the same manner as the starting material employed in Example 1), 560 parts of saturated aqueous potassium sulfate solution (containing 60 parts of potassium sulfate), and 250 parts of solid potassium sulfate was milled for 2 hours in a mill of the type employed in Example 1. Water was added to dissolve the excess potassium sulfate, and the product was isolated as a filter cake, which was dispersed with 1% of "Tamol" to obtain a paste.

The resulting paste was tested against dyestuff No. 2 of Example 1 as standard. The color strength when vatted on yarn and padded on fabric was 135% of that of the standard. The results of dispersibility and filterability tests were substantially the same as were obtained from the salt-milled product of Example 1.

Part B.—The process of Part A of this example was repeated except for the substitution of 250 parts of solid boric acid (of which 30 parts dissolved to form a saturated aqueous solution) and 500 parts of water for the potassium sulfate solution and solid potassium sulfate.

The resulting vat dye paste was tested against dyestuff No. 2 of Example 1 as standard and was rated as appreciably inferior thereto in dispersibility and much inferior in filterability when evaluated according to the following standard scale.

Very superior
Very much superior
Much superior
Considerably superior
Appreciably superior
Slightly superior
Equal
Slightly inferior
Appreciably inferior
Considerably inferior
Much inferior
Very much inferior
Very inferior

EXAMPLE 3

The vat dye used in this example was Carbanthrene Olive Green B (New Colour Index 69500), in the form of a filter cake containing 18 percent of color solids (dye solids). It was prepared by the known process involving fusing benzanthronylamino anthraquinone with alcoholic potassium hydroxide, drowning the fusion mass in an excess of water, aerating the resulting slurry, and isolating the dye precipitate as a filter cake.

The equipment used in this example consisted of an agitator-equipped cone-bottom tank, discharging from the apex of the cone to a conduit line containing a centrifugal pump, which line discharged into the top of the tank.

Part A.—The tank was charged with 2500 parts of filter cake (containing 450 parts of dye solids) and 2500 parts of water, and the mixture was agitated one hour without circulating it, to suspend the color in the water. The centrifugal pump was then started and the mixture was agitated and circulated between the top and bottom of the tank for an additional hour. Then 5985 parts of sodium chloride were added (of which about 1485 parts were required to saturate the water present) and circulation and agitation were continued for 70 hours. Water was added to dissolve the solid salt and the resulting slurry was filtered and washed to remove salt. The filter cake was dispersed with 1% of "Tamol" to obtain a vat dye paste which was tested as described in Example 1.

Part B.—For purposes of comparison, a similar vat dye paste was prepared from the vat dye filter cake employed as starting material for Part A of this example by directly dispersing it with "Tamol," without having been subjected to the intervening salt-milling treatment.

The color strength of the vat dye paste obtained in Part A of this example was 112% when "vatted" on yarn and 114% when "padded" on fabric, as compared to the vat dye paste of Part B of this example as 100%. When tested by the above dispersibility and filterability tests and measured in terms of the above standard scale, the vat dye paste of Part A was rated slightly superior in dispersibility and much superior in filterability, as compared to the vat dye paste of Part B. The filtration time was 12 seconds for the vat dye paste of Part A and 60 seconds for the vat dye paste of Part B.

The difference in appearance of the vat dye pastes of the type produced in Parts A and B of this example, respectively, is clearly evident when enlarged to 20,000 diameters. The particle size and shape are more uniform; the average particle size is smaller; the concentration of over-size particles and agglomerates is less and the paste as a whole is "cleaner" in appearance, in the case of the vat dye paste of Part A of this example, as compared to the vat dye paste of Part B of this example.

EXAMPLE 4

The vat dye used in this example was Carbanthrene Blue BCF (New Colour Index 69825), in the form of a filter cake containing 22% of dichlorindanthrone and produced by the known acid pasting procedure involving dissolving the chlorinated indanthrone in 100% sulfuric acid, adding the resulting solution to an excess of water, and filtering off the precipitate.

The equipment and procedure used in this example were the same as those used in Example 3. The charge to the tank was 3000 parts of filter cake (containing 660 parts of dye solids), 5300 parts water and 5360 parts of sodium chloride (of which about 2520 parts were required to saturate the water present).

The vat dye paste obtained upon dispersing the wet salt-milled filter cake with "Tamol" (dyestuff A) was evaluated as described above by comparison with a similar paste (dyestuff B) prepared by the same process exclusive of the wet salt-milling treatment.

The color strength of dyestuff A was equal to that of dyestuff B when "vatted" on yarn, and 108% when "padded" on fabric, based on dyestuff B as 100%. When tested by the above dispersibility and filterability tests, the non-dispersible residue obtained by both of said tests was less for dyestuff A than for dyestuff B. In the case of dyestuff A, the filtration time was 25 seconds; whereas in the case of dyestuff B, filtration time was over 180 seconds (more than three minutes).

The paste of dyestuff A was very fluid and remained so during a three-month period, whereas comparable pastes of this vat dye prepared by known methods, such as dyestuff B, set up to a thixotropic mass within such a period.

The difference in appearance of vat dye pastes of the type of dyestuffs A and B, respectively, is clearly evident when enlarged to 20,000 diameters. The superiority of dyestuff A over dyestuff B is marked. The particle size and shape are more uniform; average particle size is smaller; the concentration of over-size particles and agglomerates is less; there is a marked absence of hair-like particles and the paste as a whole is "cleaner" in appearance, in the case of dyestuff A as compared to dyestuff B.

EXAMPLE 5

The vat dye employed in this example was Carbanthrene Flavine GC (New Colour Index 69025) in the form of a filtercake containing 15% of dye solids. It was prepared by the known process involving (a) reacting 2,6-diamino anthraquinone, sulfur and benzotrichloride in the presence of a catalyst in naphthalene solution; filtering off the crude vat dye (1,2,5,6-bis-C-phenyl anthraquinone dithiazole) from the naphthalene and washing the filter cake with chlorbenzene to remove residual naphthalene; and (b) acid-pasting and "bleaching" a portion of the crude vat dye by dissolving it in 100% sulfuric acid, adding the resulting solution to an excess of water to precipitate the dye, isolating the precipitate as a filter cake, forming an aqueous slurry of the filter cake, treating the slurry with sodium hypochlorite to "bleach" the color, isolating the "bleached" vat dye as a filter cake, and washing it with water to remove water-soluble matter.

*Part I.*—The "bleached" filter cake obtained by the total treatment, (a) plus (b) of this example, was subjected to wet salt-milling in accordance with the present invention as follows:

A mixture of 800 parts of the filter cake (containing 120 parts of vat dye solids), 800 parts of solid sodium chloride, and 800 parts of water was agitated 14 hours in a vertically cylindrical vessel provided with vertically disposed baffles. Water was then added to dissolve excess solid salt; the resulting slurry was filtered; and the filter cake was dispersed with a small amount of "Tamol." The resulting dye paste is identified as dyestuff I.

*Part II.*—For purposes of comparison, another vat dye paste was prepared from the crude vat dye recovered from the naphthalene reaction medium in above step (a) of this example, by milling 10 parts of the crude vat dye with 170 parts of saturated sodium chloride brine, and 34 parts of solid sodium chloride in a "Kady" mill of the type employed in Example 1, for 2½ hours. Water was added to dissolve excess salt, and the dye was isolated as a filter cake which was washed and then dispersed with a small amount of "Tamol." The resulting dye paste is identified as dyestuff II.

To compare their properties, the two vat dye pastes were tested for color strength, especially when used in pad-jig dyeing, for dispersibility and filterability, in the manner set out above. The results are set out in the following Table 2.

*Table 2*

|  | Dyestuff I | Dyestuff II |
|---|---|---|
| Color Strength: "Pad-Jig" on Fabric | 100 | Substantially no color value. |
| Dispersibility: Residue | Slight | Slight. |
| Filterability: |  |  |
| Time | 6 Seconds | 6 Seconds. |
| Residue | Slight | Slight. |

Dyestuff II, although excellent in other respects, padded so poorly that it was worthless for use in padding processes for dyeing fabric and "package" processes for dyeing yarn. This illustrates the importance of using a vat dye which has been produced by precipitation from an aqueous medium, as starting material for the process of the present invention.

It will be evident that the invention is not limited to the details of the foregoing illustrative examples and that changes can be made without departing from the scope of the invention.

Thus, while it is preferred to employ, as the starting material for the process, a vat dye in the form of an aqueous filter cake (which term, as pointed out above, includes precipitates isolated by settling and decanting or by centrifuging, as well as by various types of filtration) which has been produced by precipitation of the vat dye from an aqueous medium followed by separation of the precipitate, it is also possible to employ, as starting material for the process of the present invention, vat dye products which are more concentrated or dried forms of such filter cakes, produced for example by heating such aqueous filter cakes under vacuum to remove water therefrom, provided the filter cake subjected to the drying treatment has been produced by precipitation of the vat dye from an aqueous medium followed by separation of the precipitate.

Filter cakes and related starting materials, of other vat dyes besides those employed in the above specific examples, which have been produced by precipitation from an aqueous medium followed by separation of the precipitate, can be employed in the practice of the present invention to obtain vat dye products characterized by improved properties as described above. The vat dyes may be of various types, including anthraquinone, indigoid and thioindigoid vat dyes; as for example,

| Vat dye: | New Color Index Number |
|---|---|
| Carbanthrene Blue GCD | 69810 |
| Carbanthrene Olive T | 69525 |
| Carbanthrene Orange 3G | 69025 |
| Carbanthrene Blue DR | 59800 |
| Carbanthrene Red FBB | 67000 |
| Carbanthrene Red BN | 68000 |
| Carbanthrene Golden Orange G | 59700 |
| Carbanthrene Direct Black RB | 65230 |
| Carbanthrene Golden Orange RRT | 59705 |
| Carbanthrene Brill. Orange RK | 59300 |
| Carbanthrene Brill. Yellow RK | 59105 |
| Carbanthrene Brill. Violet 4R | 60010 |
| Carbanthrene Golden Orange 4R | 59710 |
| Carbanthrene Violet 2R | 60010 |
| Carbanthrene Brown AR | 69015 |
| Carbanthrene Olive R | 69005 |

I claim:

1. A method of conditioning an anthraquinone vat dye, which comprises subjecting an anthraquinone vat dye, in the form of an aqueous pulp which has been produced by precipitation of the vat dye from an aqueous medium followed by separation of the precipitate, to milling in admixture with a solid water-soluble alkali metal salt of an inorganic acid in a saturated aqueous solution of a water-soluble alkali metal salt of an inorganic acid.

2. A method of conditioning an anthraquinone vat dye, which comprises subjecting an anthraquinone vat dye in the form of a filter cake which has been produced by precipitation of the vat dye from an aqueous medium followed by separation of the precipitate, to milling in admixture with a solid water-soluble alkali metal salt of an inorganic acid in a saturated aqueous solution of said salt until the resulting mixture, on standing after dilution with water to dissolve said solid salt, separates into a substantially colorless layer of the salt solution and a colored layer of aqueous suspension of the vat dye.

3. A method of conditioning an anthraquinone vat dye, which comprises subjecting an anthraquinone vat dye in the form of a filter cake which has been produced by precipitation of the vat dye from an aqueous medium followed by separation of the precipitate, to milling in admixture with a solid water-soluble alkali metal salt of an inorganic acid in a saturated aqueous solution of said salt, the amount of solid salt being at least ½ the weight of the vat dye solids in the filter cake and the amount of saturated aqueous salt solution being at least 8 times the weight of the vat dye solids in the filter cake.

4. A method as defined in claim 3 in which the salt is selected from the group consisting of sodium chloride, potassium chloride, sodium sulfate and potassium sulfate.

5. A method of conditioning an anthraquinone vat dye, which comprises subjecting an anthraquinone vat dye in the form of a filter cake which has been produced by precipitation of the vat dye from an aqueous medium followed by separation of the precipitate, to milling in admixture with a solid water-soluble alkali metal salt of an inorganic acid in a saturated aqueous solution of said salt until the resulting mixture, on standing after dilution with water to dissolve said solid salt, separates into a substantially colorless layer of the salt solution and a colored layer of aqueous suspension of the vat dye, the amount of solid salt being 2 to 10 times the weight of the vat dye solids in the filter cake and the amount of aqueous medium being 10 to 25 times the weight of the vat dye solids in the filter cake.

6. A method as defined in claim 5 in which the salt is selected from the group consisting of sodium chloride, potassium chloride, sodium sulfate and potassium sulfate.

7. A method of conditioning an anthraquinone vat dye, which comprises subjecting an anthraquinone vat dye in the form of a filter cake which has been produced by precipitation of the vat dye from an aqueous medium followed by separation of the precipitate, to milling in admixture with solid sodium chloride in a saturated aqueous solution of sodium chloride until the resulting mixture, on standing after dilution with water to dissolve said solid salt, separates into a substantially colorless layer of the salt solution and a colored layer of aqueous suspension of the vat dye, the amount of solid sodium chloride being 2 to 10 times the weight of the vat dye solids in the filter cake and the amount of saturated sodium chloride solution being 10 to 25 times the weight of the vat dye solids in the filter cake.

References Cited in the file of this patent

UNITED STATES PATENTS

| Number | Name | Date |
|---|---|---|
| 1,837,772 | Hailwood | Dec. 22, 1931 |
| 2,065,762 | Stanley | Dec. 29, 1936 |
| 2,327,472 | Vesce et al. | Aug. 24, 1943 |
| 2,486,304 | Loukomsky | Oct. 25, 1949 |
| 2,486,351 | Wiswall | Oct. 25, 1949 |
| 2,556,729 | Stallmann | June 12, 1951 |
| 2,723,980 | Tarantino et al. | Nov. 15, 1955 |
| 2,816,114 | Ehrich et al. | Dec. 10, 1957 |